Sept. 16, 1924.
T. BLAIR
1,508,440
ICE MAKING MACHINE
Filed July 13, 1922
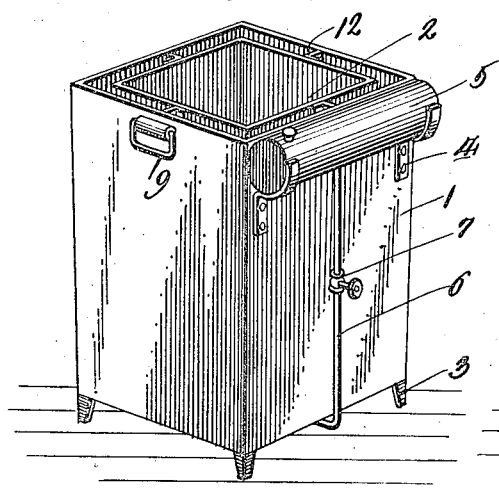
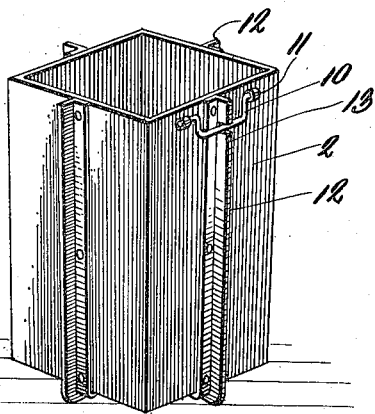
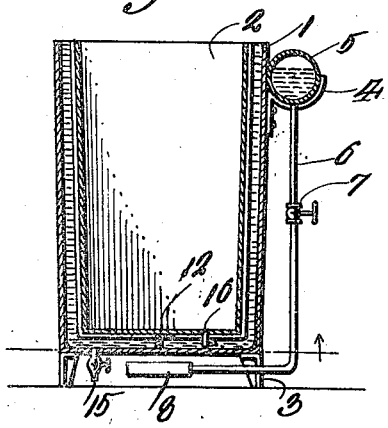
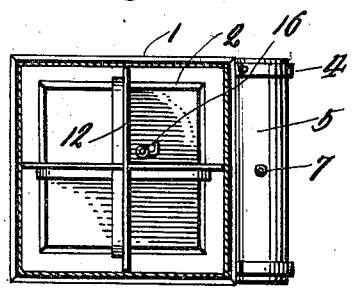
WITNESSES
Inventor
THOMAS BLAIR
By Richard B. Owen
Attorney Patented Sept. 16, 1924.

1,508,440

UNITED STATES PATENT OFFICE.

THOMAS BLAIR, OF TOGO, MINNESOTA.

ICE-MAKING MACHINE.

Application filed July 13, 1922. Serial No. 574,719.

*To all whom it may concern:*

Be it known that I, THOMAS BLAIR, a citizen of the United States, residing at Togo, in the county of Itaska and State of Minnesota, have invented certain new and useful Improvements in an Ice-Making Machine, of which the following is a specification.

The present invention relates to an ice-making device which is especially useful in cold climates where the temperature goes below the freezing point of water. The principal object of the invention is to provide a container for the water to be frozen and means whereby the water after having been frozen may be removed easily therefrom.

Another important object of this invention is to provide a device which will be extremely simple and efficient in construction, comparatively inexpensive to manufacture, reliable in operation, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is a perspective of the assembled device,

Figure 2 is a perspective of the inner receptacle,

Figure 3 is a vertical section through the device, and

Figure 4 is a bottom plan view with the bottom of the outer receptacle broken away.

Referring to the drawing in detail it will be seen that the device includes the outer receptacle 1 and the inner receptacle 2. The outer receptacle 1 is provided on its under side with a plurality of legs 3 upon which it is supported. Upon one vertical side of the outer receptacle 1 there is mounted a pair of brackets 4 adjacent its upper end which support a fuel tank 5. A pipe 6 having a regulating valve 7 therein leads from the supply fuel tank 5 to the bottom of the outer receptacle for the purpose of delivering fuel to the burner 8. Suitable handles 9 are provided adjacent the upper end of the outer receptacle so that the same may be moved from place to place as may be found necessary or desirable from time to time. It is also to be noted that both the outer receptacle 1 and the inner receptacle 2 taper toward their bottom ends.

The inner receptacle 2 is provided with suitable handles 10 preferably of U-shaped construction having their terminals mounted so as to revolve in eyes 11. Four spacing bars 12 are preferably provided on the exterior of the inner receptacle 2 and extend intermediate the sides of the side panels of the receptacle and meet centrally of the underside thereof. Each of these spacing rods is L-shaped in cross section and two of them are provided with notches 13 for receiving the handles 10 when they are in a hanging or inoperative position such as is shown in Figure 2.

A drain cock 15 is situated in the bottom of the outer receptacle 1 and a duct 16 leads from the bottom of inner receptacle 2.

The water to be frozen is placed in the receptacle 2 and exposed to the freezing temperature. When it is desired to remove the ice from the receptacle 2, the burner 8 is lighted and the water in receptacle 1, which has been placed therein, will be heated the desired temperature. When the water in receptacle 1 has been heated the burner is turned out if desired and receptacle 2 is placed therein so that the displacement caused by the placing of the inner receptacle 2 in the outer receptacle will cause the water to rise about the sides of the inner receptacle whereby the heat from the water will be transferred to the receptacle 2 melting the ice sufficiently therein so that it may be readily removed therefrom with ease.

The constructon of my invention which I have described with some degree of particularity, relates to the preferred embodiment thereof and it is to be understood that numerous changes in form, in the details of construction, and in the combination and arrangement of parts may be resorted to without departing from the spirit of the invention as hereinafter claimed.

Having thus described my invention what I claim as new is:—

In an ice making machine of the class described, an outer receptacle, an inner receptacle removaly mounted within the outer receptacle, spacing strips provided on the inner receptacle, said strips provided with notches, and handles pivotally mounted on the exterior of the inner receptacle and adapted to be received in said notches when not in use and when the inner receptacle is mounted within the outer receptacle.

In testimony whereof I affix my signature in presence of two witnesses.

THOMAS BLAIR.

Witnesses:
SIGNE BJORNSTAD,
THORLEIF BJORNSTAD.